July 27, 1937.  M. P. TAYLOR  2,088,122
TRANSFER APPARATUS FOR TRANSPORT VEHICLES
Filed Feb. 21, 1936  3 Sheets-Sheet 1

INVENTOR.
MORRIS P. TAYLOR
BY
ATTORNEY.

July 27, 1937. M. P. TAYLOR 2,088,122
TRANSFER APPARATUS FOR TRANSPORT VEHICLES
Filed Feb. 21, 1936 3 Sheets-Sheet 2

INVENTOR.
MORRIS P. TAYLOR
BY
ATTORNEY.

July 27, 1937. M. P. TAYLOR 2,088,122
TRANSFER APPARATUS FOR TRANSPORT VEHICLES
Filed Feb. 21, 1936 3 Sheets-Sheet 3
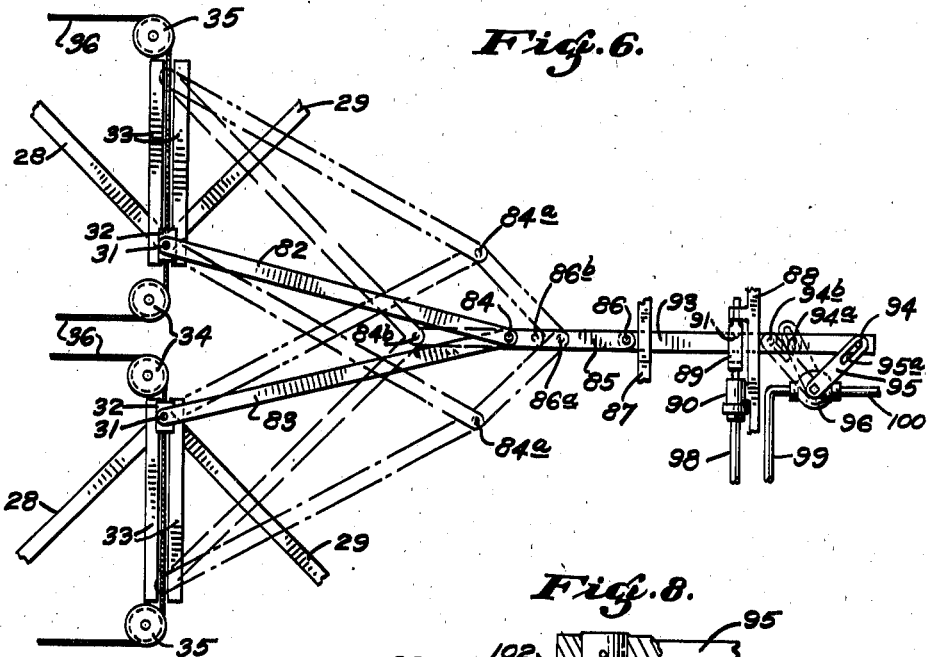
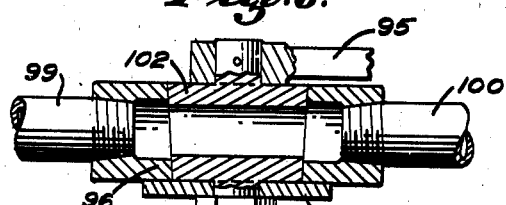
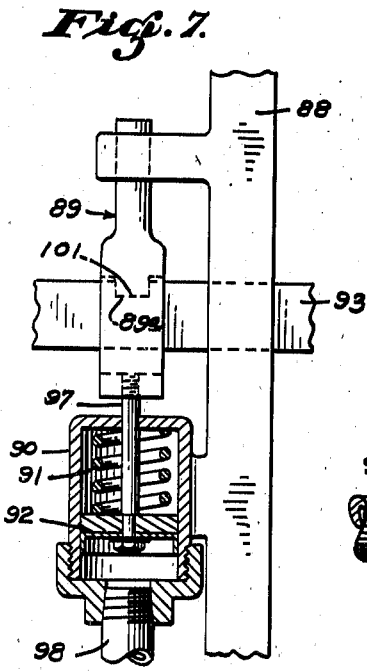
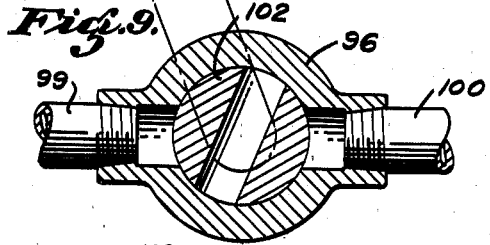
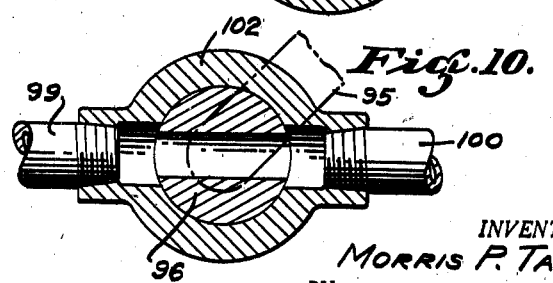
INVENTOR.
MORRIS P. TAYLOR.
BY
ATTORNEY.

Patented July 27, 1937

2,088,122

UNITED STATES PATENT OFFICE 2,088,122

TRANSFER APPARATUS FOR TRANSPORT VEHICLES

Morris P. Taylor, Stanford University, Calif.

Application February 21, 1936, Serial No. 65,103

16 Claims. (Cl. 214—65)

This invention relates to transfer apparatus for transport vehicles such as railway baggage and mail cars, automobile trucks, and the like. Broadly, the invention relates to the provision of an apparatus for facilitating rapid and convenient transfer of baggage, mail or other packages in bulk form from a transport vehicle directly to a depot platform or truck on said platform, or vice-versa, so as to eliminate the delay, confusion and damage occasioned by the handling of individual pieces by hand.

Among the objects of the invention are to provide a crane and transfer apparatus for transport vehicles by which a number of articles such as trunks, mail bags, and the like, may be removed in a lot from or into a transport vehicle, and to provide apparatus in connection therewith and operable responsive to braking mechanism of the vehicle for preventing the placing of the vehicle in motion inadvertently while the crane is in outwardly extended position.

With the foregoing and other objects in view, the invention, broadly stated, consists of the novel features and novel combination of features of the mechanism herein disclosed, the one form described herein and illustrated in the accompanying drawings being by way of example of a preferred form the invention may take, it being understood that changes in size, materials, proportion and details are contemplated as being within the invention and within the scope of the appended claims.

In the accompanying drawings,

Fig. 6 is a diagrammatic plan view of control apparatus operatively connected to the brake mechanism of a vehicle.

Fig. 7 is an enlarged detail of locking structure of Fig. 6.

Fig. 8 is an enlarged detail in vertical section of valve structure of Fig. 6.

Figs. 9 and 10 are enlarged detail views in horizontal section of valve structure of Fig. 6.

Figure 1:
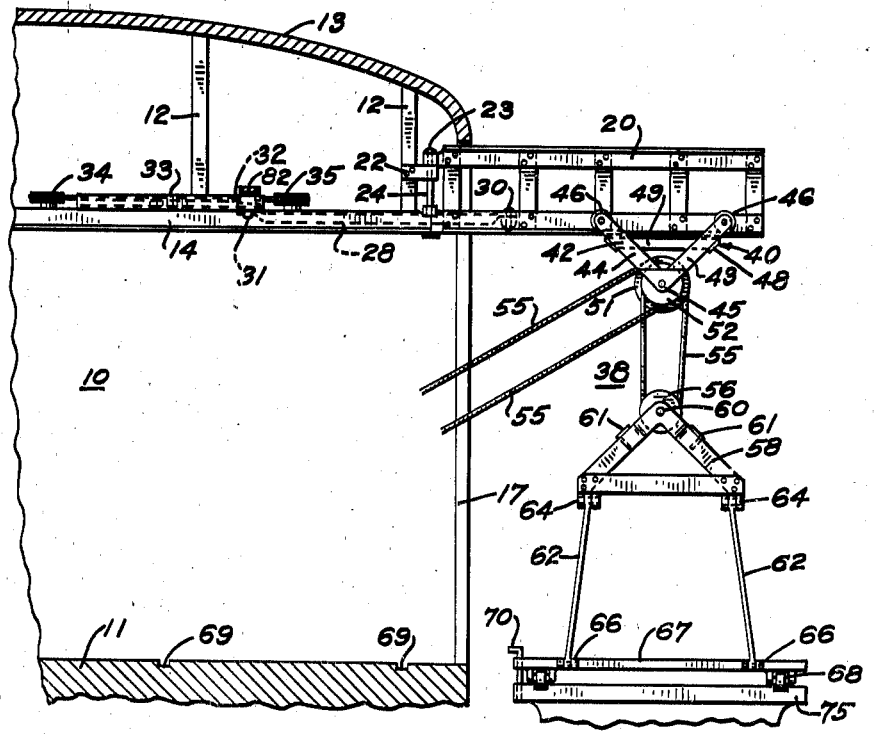
Fig. 1 is a side elevational view with apparatus in extended position and with body of a transport vehicle in fragmentary transverse vertical section.
Figure 2:
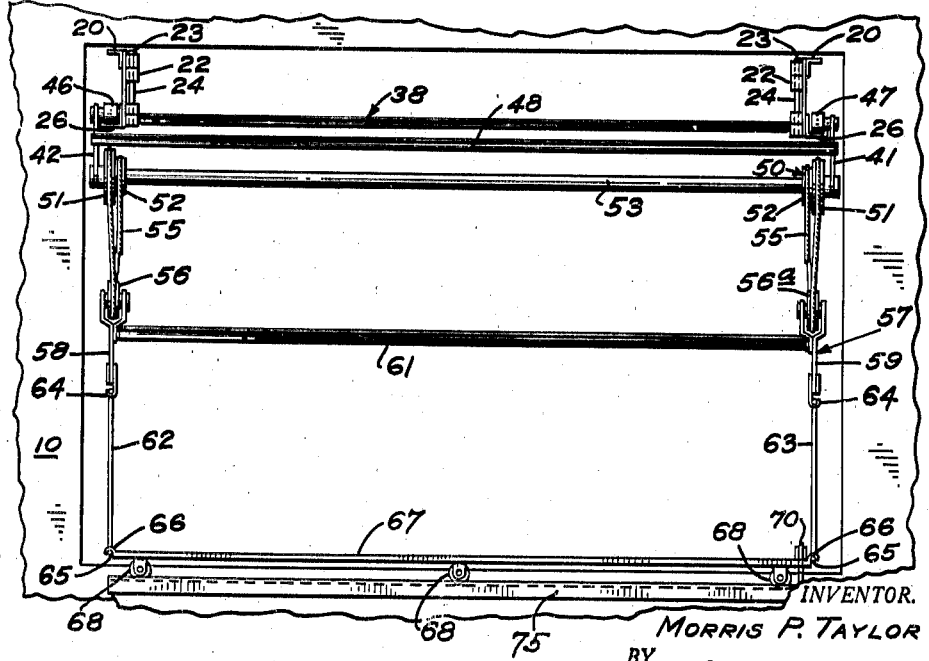
Fig. 2 is an elevational front end view of the apparatus.
Figure 3:
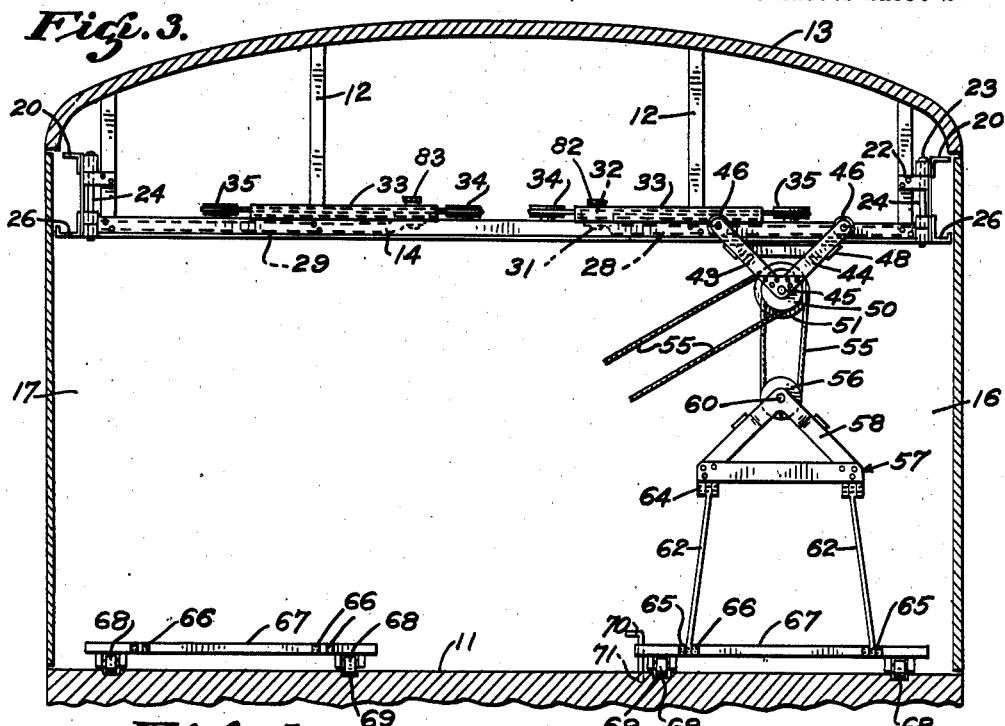
Fig. 3 is a side elevational view with apparatus in normal retracted position and with body of transport vehicle in fragmentary transverse vertical section.
Figure 4:
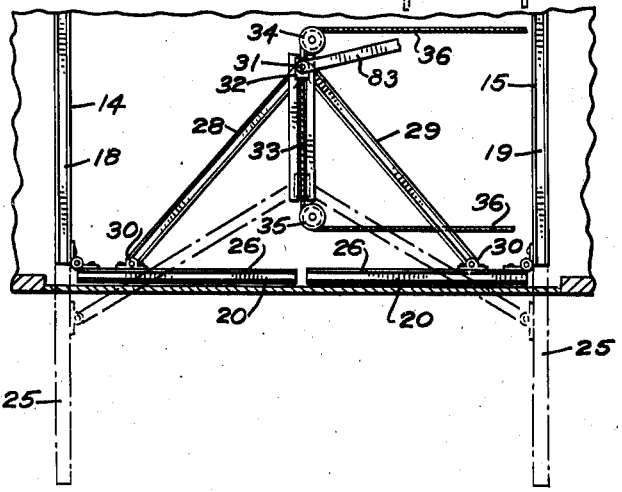
Fig. 4 is a fragmentary plan view, partly in section, illustrating truck arm structure with crane arms in retracted position and with the extended position of the crane arm indicated in skeleton.

Referring to the drawings, in which like characters of reference indicate corresponding parts in the several views, 10 indicates generally the body of a transport vehicle, such as a railway express or baggage car, automotive truck body, or the like, provided with the usual floor, 11, and having an overhead frame support, generally indicated 12. The frame in the present exemplification is mounted to the roof 13, of the vehicle, but may be arranged in any other suitable manner to support a pair of horizontal overhead tracks, 14 and 15, which extend transversely of the longitudinal dimension of the vehicle, as best shown in Fig. 3, being positioned adjacent opposite door openings 16 and 17 and substantially at right angles thereto. The tracks 14, 15 are each provided with a channel or groove, 18, 19 throughout the length thereof. At the end of each of the respective tracks 14, 15 there is mounted a crane arm 20 which normally lies in a folded inboard position, preferably within the vehicle body overlying the plane of the floor 11, so that the door openings 16, 17 may be appropriately closed by any suitable type of door closure, such as the ordinary sliding door, thereby enclosing the crane arm within the vehicle body. The preferred form of mounting the crane arm is by means of a bracket 22 which may be mounted to the frame 12 and being provided with a pivotal connection 23 having a pivot pin 24 upon which the crane arm may be swung outwardly as indicated at 25 in Fig. 4. Each crane arm carries a horizontal track member 26, which, when the crane arm is swung outwardly, provides an extended horizontal continuation of the tracks 14, 15.

The crane arms 20 are moved outwardly and inwardly, respectively, by truss arms 28, 29, the latter being pivotally connected to the crane arm as at 30 and having their opposite ends relatively connected pivotally as at 31, preferably in a sliding block 32 which is adapted for reciprocation in a guide slot 33. Means are provided for facilitating the sliding of the block 32, comprising a pair of pulleys 34, 35 which are relatively spaced at opposite ends of the guide 33 and have a cable 36 passing thereover and connected to the block 32. The truss arms 28, 29 not only serve to manipulate the crane arm inwardly and outwardly, but when the crane arms are in an outward position, the truss arms 28, 29 serve to rigidly reinforce them due to the angle of inclination of the truss arms relative to each other when the crane arms are in an outwardly extended position.

Figure 5:
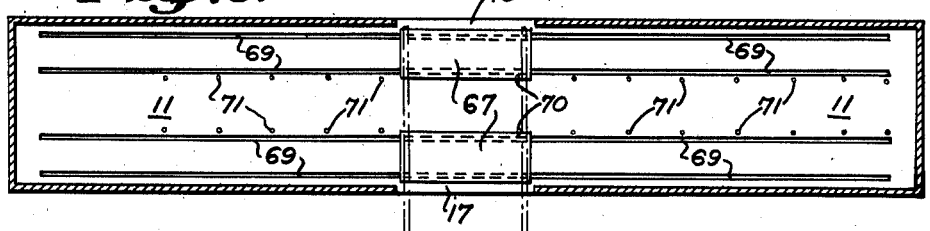
Fig. 5 is a plan view of floor of a transport vehicle body illustrating the relation of the transfer apparatus to longitudinal tracks on the vehicle floor.

A conveyer mechanism generally indicated 38 is provided to ride on the tracks 14, 15 and on the track 26 of the crane arm. The conveyer comprises a traveler member 40 which comprises angular brackets 41, 42, each bracket having a pair of arms 43, 44, rigidly joined at the apex 45 of the bracket, and having at the free end of said arm roller members 46, 47. The rollers of the respective brackets ride in the respective grooves 18, 19 of the track 14, 15 and when the crane arms 20 are in extended position the rollers 46 may also travel in the track 26 of the crane arm. The brackets 41, 42 in the respective oppositely disposed tracks 14, 15 are connected by cross-bar members 48, so that the brackets 41, 42 move in unison in the respective tracks 14, 15. A strap 49 may be provided from one bracket arm to the other bracket arm for purposes of reinforcement. Rotatively mounted, as at the apex 45 of the angle arms of each bracket 41, 42 is a pulley member 50 preferably comprising a pair of pulley wheels 51, 52 of relatively different diameters and fixedly connected to rotate in unison. Preferably, the shaft on which the pulley wheels 50 rotate comprises a cross-bar 53 mounted at its ends in the apices of the brackets 41, 42 and thereby affording reinforcement from one bracket to the other, transversely of the traveler member 40. A suitable chain or cable 55 passes over each of the pulleys 51 in the pulley wheels 50 and thence around secondary pulley wheels 56 and 56a and thence around the other pulley wheels 52 of the pulleys 50, thereby providing a differential pulley hoist whereby mechanical advantage may be obtained due to the differential of leverage in the pulley wheels 51, 52 of the pulley 50. A hoist is thus provided for a carriage, generally indicated 57, which may be of any suitable type and as herein exemplified comprises a pair of triangular frames 58, 59, each being mounted on an axial shaft 60 of the respective pulley wheels 56 and 56a. The frames 58 and 59 are connected and relatively stabilized by a cross bar 61 connected therebetween. Each of the frames 58, 59 are provided with a pair of hanger rods 62, 63 which are releasably mounted to the frames 58, 59 as at 64. At their opposite ends the hanger rods 62, 63 have suitable releasable connection, such as hook 65, for releasably engaging a cooperating member such as hooks 66 which are mounted at the respective ends of a transfer platform 67. The transfer plateform 67 carries at each end of its underside, and preferably also at the center, roller members 68. The vehicle floor 11 is provided with longitudinal grooves or tracks 69 for receiving the rollers 68 of the transfer platform when the transfer platform is within the body of the vehicle floor. The transfer platform may be moved longitudinally of the vehicle so that a plurality of such transfer platforms may be employed, if desired, as shown in Fig. 5. The transfer platform may also be provided with a suitable means for preventing unintended movement on the tracks of the vehicle floor. This locking means may be of any suitable type and may apply directly to the rollers of the transfer platform in the form of a brake or, as herein exemplified, may comprise a locking pin 70 which may be raised and lowered in the floor of the transfer platform to engage recesses 71 which are spaced along the track 69 in the floor 11 of the vehicle.

From the foregoing description, it is believed that the mode of operation will be practically self-explanatory. Briefly, while the vehicle is in motion the baggage man within the vehicle moves the required number of transfer platforms toward the respective ends of the vehicle and locks them in place by means of the locking member 70 and the recesses 71. Baggage, mail, or other types of packages may then be loaded on the transfer platform for discharge at the next station. When the transfer platform or platforms are loaded, the locking means is released and the transfer platforms are rolled under the transverse tracks 14, 15. As soon as the vehicle is stopped, the cable 36 is manipulated to move the block 32 and truss arms 28, 39, whereby crane arms 20 are moved outwardly to an extended position over the freight platform of the station. The transfer platform is then attached at its respective ends to the hanger rods 62, 63, and is lifted by means of the hoist mechanism and is then moved out over the freight platform of the station by the conveyer and lowered to the station platform. After the baggage has been unloaded from the transfer platform, other baggage which is to be transported from that station may be moved on to the transfer platform and by reversal of the operation of the conveyer may be moved into the vehicle. Obviously, additional transfer platforms may be provided for use at stations and the operation of loading and unloading facilitated by having the outgoing baggage loaded on a transfer platform in advance of the arrival of the vehicle. The rollers 68 on the transfer platform may be of any suitable size for rolling the transfer platforms longitudinally within the vehicle and also acting as roller means by which the transfer platforms may be moved about the station platform. It is also apparent that the transfer platform could be lowered upon a station truck 75 and moved into the baggage room in that manner. The crane arms are moved outwardly to their extended position and retracted to their normal position within the vehicle by means of manipulating the cable 36 which moves the sliding block 32 and thereby the truss arms 28 and 29. When the crane arms 20 are being extended outwardly or retracted inwardly the conveyer unit 40 is manipulated inwardly relative to the vehicle body so that it rests upon tracks 14, 15. Upon moving the conveyer unit 40 transversely of the vehicle, the transfer platforms may be deposited in the tracks 69 on either side of the vehicle. It is to be understood that a pair of crane arms 20 may be mounted at either one or both sides of the vehicle so that loading and unloading may be from doors on either side of the vehicle body, depending on which side the station platform happens to be.

Thus far, the mechanism and operation of the crane and carriage have been described. If desired, locking means may be provided operatively connecting the crane to brake operating mechanism of a vehicle, and particularly to air brake mechanism which is standard equipment of railroad cars, for the purpose of insuring that the train or vehicle will not be inadvertently put in motion while the crane arms are extended outwardly. Standard braking mechanism being well known in many suitable types, it may be assumed that any suitable type may be employed, as the specific form of the braking mechanism is not, per se, a part of this invention, and is therefore not shown in the drawings.

In this mode of operation of the apparatus the control bars 28 and 29 are pivoted by the pin 31 on the sliding block 32, which is guided in the groove made by the bars 33, as previously described. To the pins 31 are attached by freely turning bearings control bars 82 and 83, which are pivoted together by pin 84. To pin 84 is also pivoted the link 85, the other end of which is attached by the freely turning pin 86 to the interlocking bar 93. The interlocking bar 93 is free to slide in a straight line in guides 87 and 88, unless locked as described hereafter. The guides 87 and 88 are attached to the car roof or sides as may be convenient. If either or both of the cranes are swung outboard, moving the respective blocks 32 and pins 31, the interlocking bar 93 must slide in its guides so that the pin 86 assumes the position 86$^a$ if one crane only is being extended outwardly, and to position 86$^b$ if both cranes are extended outwardly simultaneously; and if one crane only is being used, it is obvious that the pin 84 of link 85 will swing to one of the positions 84$^a$, depending on which crane is being extended; and that if both cranes are extended simultaneously, the pin 84 assumes the position 84$^b$. Conversely, if the interlocking bar 93 is locked so that pin 86 is in its normal position as shown in Fig. 6, the cranes cannot be swung out.

The interlocking bar 93 is provided with the notch 101. When the cranes are inboard, this notch is in line with the interlocking dog 89, which has a latch or tongue 89$^a$ that fits into the notch 101. This interlocking dog 89 is also guided by the guide 88, and is moved by the piston 92 by means of the piston rod 97. The piston 92 works in the cylinder 90, and is held in position by the spring 91 for locking latch 89$^a$. The lock is released by means of air pressure from the air brake cylinder being applied through pipe 98 to the cylinder body and to the face of piston 92, which pressure must be sufficient to overcome the force of the spring 91. Thus the cranes cannot be unlocked until a predetermined air pressure is made in application of the air brakes, and sufficient to overcome the pressure of spring 91 which can be set at any desired value.

The car is prevented from moving with the cranes outboard as follows:—At the end of the interlocking bar 93 is the pin 94. A valve 96 is equipped with the operating valve lever 95, which has a slot 95$^a$ so that it can be turned by the movement of the pin 94. The valve 96 is to be such that it is open when the pin 94 on the interlocking bar 93 is in the position shown in Fig. 6, with the bar 93 in locked position. When the pin 94 is in position 94$^a$ or 94$^b$, (depending on whether one or both cranes are extended outwardly), the valve is to be closed. The valve shown is a simple plug valve, consisting of body 96 with the taper plug valve 102 fitted into it, free to rotate.

The taper valve is held in place by washer 103 and nut 104. The valve is turned by the lever 95, through the pin 105. When the opening in the plug valve coincides with the openings in the body 96, the valve is open and air is free to pass through it. When the plug valve 102 is turned so that the plug valve closes off the openings in the valve body 96, the valve is closed and air cannot pass through.

When the valve handle pin 94 is in position 94$^a$ with one crane out, or in the position 94$^b$ with both cranes out, the valve is shut. The pipe 99 leading to this valve is the air brake retainer pipe, the one through which the air brake cylinder exhausts when the brakes are released. When either one or both of the cranes are outboard, the valve is closed, and the air pressure from the brake cylinder cannot be released. Thus the car cannot be moved with either of the cranes out, as the brake cannot be released on the car. When the cranes are inboard, the valve is open, and the brake released, the brake cylinder can freely exhaust through the open valve.

The exhaust pipe 100 leading from the valve 96 has its other end open to atmosphere, or to a suitable standard air brake retaining valve, if one is used. This pipe 100 is the exhaust discharge from valve 96 when valve 96 is open.

Another method of working this brake lock is to set the valve so that it is closed when the cranes are in and open when the cranes are out. In this case, pipe 99 is tapped into the train line, and pipe 100 may lead to a spring loaded or pneumatically loaded valve of suitable type set to open at some predetermined pressure less than the train line pressure when the brakes are in running position. Thus if the cranes are out and the valve 96 is open, the engineer will not be able to recharge the train line sufficiently to release the brakes on the train. When the cranes are in, the valve will be shut, and the engineer may then recharge the train line and release the brakes.

Having thus described my invention, what I claim and desire to secure by Letters Patent of the United States is:—

1. In a transport vehicle a transfer apparatus comprising a supporting frame raised above the floor of the vehicle, a fixed horizontal overhead track mechanism mounted on the frame, a crane adapted for movement from a normal inboard position to an extended position outwardly beyond the confines of the vehicle, said crane having a horizontal track thereon which, when the crane is extended beyond the transport vehicle, is substantially aligned horizontally with and a continuation of the overhead track on the frame, conveyer means adapted for movement on the respective overhead and crane tracks, and a means carried by the conveyer means for engaging a transfer platform releasably carried by the conveyer.

2. In a transport vehicle, a transfer apparatus comprising a supporting frame raised above the floor of the vehicle, a pair of relatively spaced fixed overhead tracks mounted horizontally on the frame, a pivotally mounted crane adapted for movement from a normal inboard position to an extended position outwardly beyond the confines of the vehicle, said crane having tracks thereon which, when the crane is extended beyond the transport vehicle, are substantially aligned with and a continuation of the overhead tracks on the frame, conveyer means adapted for movement on the respective overhead and crane tracks, said conveyer including a traveler member provided with rollers to ride in the overhead and crane arm tracks, a carriage having arms for releasably engaging a transfer platform and hoisting tackle operatively between the traveler and carriage, and a transfer platform releasably carried by the conveyer means.

3. In a transport vehicle, a transfer apparatus comprising a supporting frame raised above the floor of the vehicle, a pair of relatively spaced fixed overhead tracks mounted horizontally on the frame, a pivotally mounted crane adapted for movement from a normal inboard position to an extended position outwardly beyond the confines of the vehicle, said crane having horizontal tracks thereon which, when the crane is extended beyond the transport vehicle, are substantially aligned with and a continuation of the overhead tracks on the frame, said crane comprising a pair of crane arms, one of which is complementary to each overhead track, conveyer means adapted for movement on the respective overhead and crane tracks, said conveyer including a traveler member provided with rollers to ride in the overhead and crane arm tracks, a carriage having arms for releasably engaging a transfer platform and hoisting tackle operatively between the traveler and carriage, and a transfer platform releasably carried by the conveyer means.

4. In a transport vehicle, a transfer apparatus comprising a supporting frame raised above the floor of the vehicle, a pair of relatively spaced fixed overhead tracks mounted on the frame, a crane adapted for movement from a normal inboard position to an extended position outwardly beyond the confines of the vehicle, said crane having tracks thereon which, when the crane is extended beyond the transport vehicle, are substantially aligned with and a continuation of the overhead tracks on the frame, said crane comprising a pair of crane arms, one of which is complementary to each overhead track, means for bracing the crane at its outwardly extended position against inadvertent return to its normal position, conveyer means adapted for movement on the respective overhead and crane tracks, and a transfer platform releasably carried by the conveyer.

5. In a transport vehicle, a transfer apparatus comprising a supporting frame raised above the floor of the vehicle, a pair of relatively spaced fixed overhead tracks mounted on the frame, a crane adapted for movement from a normal inboard position to an extended position outwardly beyond the confines of the vehicle, said crane having tracks thereon which, when the crane is extended beyond the transport vehicle, are substantially aligned with and a continuation of the overhead tracks on the frame, said crane comprising a pair of crane arms, one of which is complementary to each overhead track, means for bracing the crane at its outwardly extended position against inadvertent return to its normal position, conveyer means adapted for movement on the respective overhead and crane tracks, said conveyer including a traveler member provided with rollers to ride in the overhead and crane arm tracks, a carriage having arms for releasably engaging a transfer platform and hoisting tackle operatively between the traveler and carriage, and a transfer platform releasably carried by the conveyer.

6. In a transport vehicle, a transfer apparatus comprising a supporting frame raised above the floor of the vehicle, a pair of relatively spaced overhead tracks mounted on the frame, a crane adapted for movement from a normal position overlying the plane of the vehicle floor to an extended position outwardly beyond the confines of the vehicle, said crane having tracks thereon which, when the crane is extended beyond the transport vehicle, are substantially aligned with and a continuation of the overhead tracks on the frame, said crane comprising a pair of crane arms, one of which is complementary to each overhead track, means for bracing the crane at its outwardly extended position against inadvertent return to its normal position, said brace means including a guide member, a pair of truss arms each pivotally connected at one end to a crane arm, and having their respective opposite ends cooperatively relatively connected in slidable relation with said guide member, conveyer means adapted for movement on the respective overhead and crane tracks, said conveyer including a traveler member provided with rollers to ride in the overhead and crane arm tracks, a carriage having arms for releasably engaging a transfer platform and hoisting tackle operatively between the traveler and carriage, and a transfer platform releasably carried by the conveyer.

7. In a transport vehicle, a transfer apparatus comprising a supporting frame raised above the floor of the vehicle, a pair of relatively spaced overhead tracks mounted on the frame, a crane adapted for movement from a normal position overlying the plane of the vehicle floor to an extended position outwardly beyond the confines of the vehicle, said crane having tracks thereon which, when the crane is extended beyond the transport vehicle, are substantially aligned with and a continuation of the overhead tracks on the frame, said crane comprising a pair of crane arms, one of which is complementary to each overhead track, means for bracing the crane at its outwardly extended position against inadvertent return to its normal position, said brace means including a guide member, a pair of truss arms each pivotally connected at one end to a crane arm, and having their respective opposite ends cooperatively relatively connected in slidable relation with said guide member, conveyer means adapted for movement on the respective overhead and crane tracks, said conveyer including a traveler member provided with rollers to ride in the overhead and crane arm tracks, a carriage having arms for releasably engaging a transfer platform and hoisting tackle operatively between the traveler and carriage, and a transfer platform releasably carried by the conveyer, said transfer platform being provided with rollers thereunder for riding in the tracks of the vehicle floor.

8. In a transport vehicle, having floor tracks longitudinally thereof, a transfer apparatus comprising a supporting frame raised above the floor of the vehicle, a pair of relatively spaced overhead tracks mounted on the frame, a crane adapted for movement from a normal position overlying the plane of the vehicle floor to an extended position outwardly beyond the confines of the vehicle, said crane having tracks thereon which, when the crane is extended beyond the transport vehicle, are substantially aligned with and a continuation of the overhead tracks on the frame, said crane comprising a pair of crane arms, one of which is complementary to each overhead track, means for bracing the crane at its outwardly extended position against inadvertent return to its normal position, said brace means including a guide member, a pair of truss arms each pivotally connected at one end to a crane arm, and having their respective opposite ends cooperatively relatively connected in slidable relation with said guide member, conveyer means adapted for movement on the respective overhead and crane tracks, said conveyer including a traveler member provided with rollers to ride in the overhead and crane arm tracks, a carriage having arms for releasably engaging a transfer platform and hoisting tackle operatively between the traveler and carriage, and a transfer platform releasably carried by the conveyer, said transfer platform being provided with rollers thereunder for riding in the tracks of the vehicle floor.

9. In a transport vehicle having floor tracks longitudinally thereof, a transfer apparatus comprising a supporting frame raised above the floor of the vehicle, a pair of relatively spaced fixed overhead horizontal tracks mounted on the frame adjacent door openings of the vehicle and transversely of the vehicle body relative to the floor tracks, a crane adapted for movement from a normal inboard position to an extended position outwardly beyond the confines of the vehicle, said crane having horizontal tracks thereon which, when the crane is extended beyond the transport vehicle, are substantially aligned with and a continuation of the overhead tracks on the frame, conveyer means adapted for movement on the respective overhead and crane tracks, and a transfer platform releasably carried by the conveyer means, said transfer platform being provided with rollers thereunder for riding in the tracks of the vehicle floor.

10. In a transport vehicle having floor tracks longitudinally thereof, a transfer apparatus comprising a supporting frame raised above the floor of the vehicle, a pair of relatively spaced fixed overhead tracks mounted on the frame adjacent door openings of the vehicle and transversely of the vehicle body relative to the floor tracks, a crane adapted for movement from a normal inboard position to an extended position outwardly beyond the confines of the vehicle, said crane having tracks thereon which, when the crane is extended beyond the transport vehicle, are substantially aligned with and a continuation of the overhead tracks on the frame, means for bracing the crane at its outwardly extended position against inadvertent return to its normal position, conveyer means adapted for movement on the respective overhead and crane tracks, and a transfer platform releasably carried by the conveyer, said transfer platform being provided with rollers thereunder for riding in the tracks of the vehicle floor.

11. In a transport vehicle having floor tracks longitudinally thereof, a transfer apparatus comprising a supporting frame raised above the floor of the vehicle, a pair of relatively spaced fixed overhead horizontal tracks mounted on the frame adjacent door openings of the vehicle and transversely of the vehicle body relative to the floor tracks, a pivotally mounted crane adapted for movement from a normal inboard position to an extended position outwardly beyond the confines of the vehicle, said crane having horizontal tracks thereon which, when the crane is extended beyond the transport vehicle, are substantially aligned with and a continuation of the overhead tracks on the frame, said crane comprising a pair of crane arms, one of which is complementary to each overhead track, conveyer means adapted for movement on the respective overhead and crane tracks, said conveyer means including a traveler member provided with rollers to ride in the overhead and crane arm tracks, a carriage having arms for releasably engaging a transfer platform and hoisting tackle operatively between the traveler and carriage, and a transfer platform releasably carried by the conveyer means, said transfer platform being provided with rollers thereunder for riding in the tracks of the vehicle floor.

12. In a transport vehicle having floor tracks longitudinally thereof, a transfer apparatus comprising a supporting frame raised above the floor of the vehicle, a pair of relatively spaced fixed overhead tracks mounted on the frame adjacent door openings of the vehicle and transversely of the vehicle body relative to the floor tracks, a crane adapted for movement from a normal inboard position to an extended position outwardly beyond the confines of the vehicle, said crane having tracks thereon which, when the crane is extended beyond the transport vehicle, are substantially aligned with and a continuation of the overhead tracks on the frame, said crane comprising a pair of crane arms, one of which is complementary to each overhead track, means for bracing the crane at its outwardly extended position against inadvertent return to its normal position, conveyer means adapted for movement on the respective overhead and crane tracks, said conveyer including a traveler member provided with rollers to ride in the overhead and crane arm tracks, a carriage having arms for releasably engaging a transfer platform and hoisting tackle operatively between the traveler and carriage, and a transfer platform releasably carried by the conveyer, said transfer platform being provided with rollers thereunder for riding in the tracks of the vehicle floor.

13. In a transport vehicle having floor tracks longitudinally thereof, a transfer apparatus comprising a supporting frame raised above the floor of the vehicle, a pair of relatively spaced overhead tracks mounted on the frame adjacent door openings of the vehicle and transversely of the vehicle body relative to the floor tracks, a crane adapted for movement from a normal position overlying the plane of the vehicle floor to an extended position outwardly beyond the confines of the vehicle, said crane having tracks thereon which, when the crane is extended beyond the transport vehicle, are substantially aligned with and a continuation of the overhead tracks on the frame, said crane comprising a pair of crane arms, one of which is complementary to each overhead track, means for bracing the crane at its outwardly extended position against inadvertent return to its normal position, said brace means including a guide member, a pair of truss arms each pivotally connected at one end to a crane arm, and having their respective opposite ends cooperatively relatively connected in slidable relation with said guide member, conveyer means adapted for movement on the respective overhead and crane tracks, said conveyer including a traveler member provided with rollers to ride in the overhead and crane arm tracks, a carriage having arms for releasably engaging a transfer platform and hoisting tackle operatively between the traveler and carriage, and a transfer platform releasably carried by the conveyer, said transfer platform being provided with rollers thereunder for riding in the tracks of the vehicle floor.

14. In a transport vehicle having floor tracks longitudinally thereof, a transfer apparatus comprising a supporting frame raised above the floor of the vehicle, a pair of relatively spaced overhead tracks mounted on the frame adjacent door openings of the vehicle and transversely of the vehicle body relative to the floor tracks, a crane adapted for movement from a normal position overlying the plane of the vehicle floor to an extended position outwardly beyond the confines of the vehicle, said crane having tracks thereon which, when the crane is extended beyond the transport vehicle, are substantially aligned with and a continuation of the overhead tracks on the frame, said crane comprising a pair of crane arms, one of which is complementary to each overhead track, means for bracing the crane at its outwardly extended position against inadvertent return to its normal position, said brace means including a guide member, a pair of truss arms each pivotally connected at one end to a crane arm, and having their respective opposite ends cooperatively relatively connected in slidable relation with said guide member, conveyer means adapted for movement on the respective overhead and crane tracks, said conveyer including a traveler member provided with rollers to ride in the overhead and crane arm tracks, a carriage having arms for releasably engaging a transfer platform and hoisting tackle operatively between the traveler and carriage, and a transfer platform releasably carried by the conveyer, said transfer platform being provided with rollers thereunder for riding in the tracks of the vehicle floor, and with means for arresting movement of said platform on said floor tracks of the transport vehicle.

15. In a transport vehicle, a transfer apparatus comprising a supporting frame raised above the floor of the vehicle, a fixed overhead track mechanism mounted on the frame, a crane adapted for movement from a normal inboard position to an extended position outwardly beyond the confines of the vehicle, said crane having a track thereon which, when the crane is extended beyond the transport vehicle, is substantially aligned with and a continuation of the overhead track on the conveyer, means adapted for movement on the respective overhead and crane tracks, means carried by the conveyer means for engaging a transfer platform, and means operable by the braking mechanism of the vehicle for locking and unlocking the crane member at an inboard position.

16. In a transport vehicle, a transfer apparatus comprising a supporting frame raised above the floor of the vehicle, a fixed overhead track mechanism mounted on the frame, a crane adapted for movement from a normal inboard position to an extended position outwardly beyond the confines of the vehicle, said crane having a track thereon which, when the crane is extended beyond the transport vehicle, is substantially aligned with and a continuation of the overhead track on the conveyer, means adapted for movement on the respective overhead and crane tracks, means carried by the conveyer means for engaging a transfer platform, and means operable by the braking mechanism of the vehicle for locking and unlocking the crane member at an inboard position, and for preventing movement of the vehicle when the crane member is in outboard position.

MORRIS P. TAYLOR.